No. 851,010. PATENTED APR. 23, 1907.
J. KELLING.
FLOOR SCRAPER.
APPLICATION FILED FEB. 2, 1907.
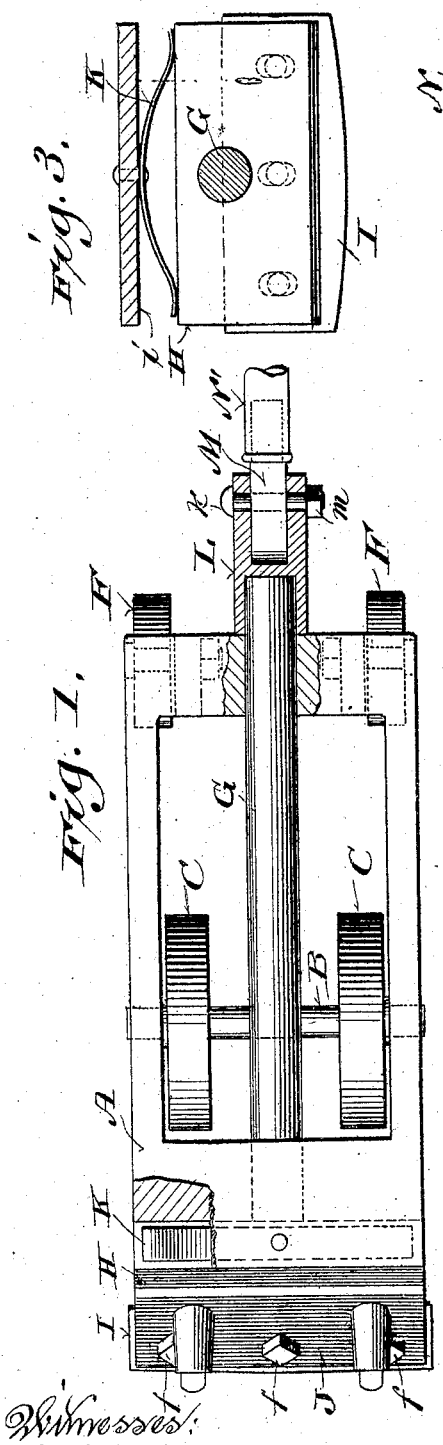
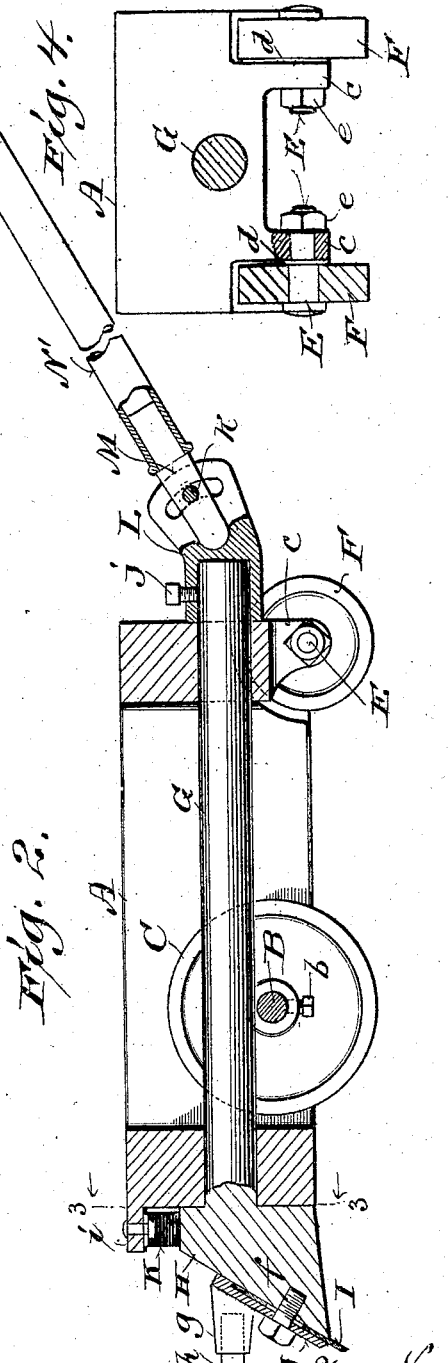

UNITED STATES PATENT OFFICE.

JOHN KELLING, OF MILWAUKEE, WISCONSIN, ASSIGNOR OF ONE-HALF TO ROYAL M. A. HERZER, OF MILWAUKEE, WISCONSIN.

FLOOR-SCRAPER.

No. 851,010.      Specification of Letters Patent.      Patented April 23, 1907.

Application filed February 2, 1907. Serial No. 355,430.

*To all whom it may concern:*

Be it known that I, JOHN KELLING, a citizen of the United States, and a resident of Milwaukee, in the county of Milwaukee and State of Wisconsin, have invented certain new and useful Improvements in Floor-Scrapers; and I do hereby declare that the following is a full, clear, and exact description thereof.

The invention consists in what is herein shown, described, and claimed, its object being to provide simple, economical, and efficient floor-scrapers each having its blade-head rotary adjustable in either direction at the will of the operator to permit of scraping close to mop-boards or floor-molding, provision being had in connection with said head to prevent marring of said mop-boards.

Figure 1 of the accompanying drawings represents a plan view of a floor-scraper in accordance with my invention, partly broken away; Fig. 2, a vertical longitudinal central section of the same; Fig. 3, a transverse section on the plane indicated by line 3 3 in Fig. 2; and Fig. 4, a rear end view of said scraper, partly broken away and in section.

Referring by letter to the drawings, A indicates a preferably cast-iron frame having the sides thereof provided with apertures for the engagement of a loose axle B, carrying wheels C, each fastened thereto by a set-screw $b$, these wheels being inside said frame. The rear end of the frame is provided with depending bearings $c$ for bolt-spindles E, that serve as axles for wheels F of less diameter than the ones C aforesaid, these smaller wheels being overhung by rear corners of the aforesaid frame. Washers $d$ are interposed between the wheels C and the bearings for their spindles, and nuts $e$ are run on the screw ends of said spindles against said bearings.

The frame, axle, spindles, wheels, and minor parts in the assemblage aforesaid constitute a truck, and loose in end apertures of said frame central of the truck is a pivot-shank G of a head H, having a front inclined surface upon which to seat a curved edge scraping-blade I, that is provided with transverse slots engaged by set-screws $f$, that engage said head, these screws having been passed through apertures in a blade-holder J to bind this holder against said blade when the latter is in adjusted position. The blade-holder is shown provided with forwardly-projecting sockets $g$, with which elastic buffer-plugs $h$ are engaged.

Riveted or otherwise fastened to a front upper ledge $i$ of the truck-frame is a semi-elliptic spring K, that bears at both ends against the head H to resist turning of this head in either direction from normal position, and held by a set-screw $j$ on the rear end of the head-shank is a clevis L, in which the rounded end of a tang M is fulcrumed, said tang being held in adjusted position by a bolt $k$ engaging it and segmental slots in the sides of the clevis-fork, a clamp-nut $m$ being run on the screw-threaded end of the bolt. Fitted on the tang M is the preferably tubular shank N' of a handle N at right angles to said shank, said handle being adjustable to various elevations to accommodate operators of the scraper.

The truck is normally horizontal, as herein shown, and is tilted forward to bring the scraper-blade into working position, the scraper as a whole being then drawn rearward on its large truck-wheels to effect a scraping operation, and by turning with the handle said blade may be canted in either direction in order to have the same operate close to mop-boards or floor-molding, this being an important feature of my invention. The spring K insures return of the head H and parts in connection therewith to normal position when pressure to cant the same in either direction from such position is removed.

I claim—

1. A floor-scraper comprising a truck, a blade-head having a pivot-shank for which the truck is provided with bearings, and a handle in connection with said shank by which to rock said blade-head in either direction at will.

2. A floor-scraper comprising a truck, a blade-head having a pivot-shank mounted in the truck, a clevis having a socket end in which said shank is detachably secured, and a handle attached to the clevis.

3. A floor-scraper comprising a truck, a blade-head having a pivot-shank mounted in the truck, a clevis having a socket end in which said shank is detachably secured, a tang fulcrumed in the clevis-fork, means for securing the tang in adjusted position, and a handle having a shank fitted on said tang.

4. A floor-scraper comprising a truck, a blade-head in rotary adjustable connection with the truck, and a spring arranged to resist canting of the head in either direction from normal position.

In testimony that I claim the foregoing I have hereunto set my hand, at Milwaukee, in the county of Milwaukee and State of Wisconsin, in the presence of two witnesses.

JOHN KELLING.

Witnesses:
H. E. OLIPHANT,
GEORGE FELBER.